July 10, 1962  S. BELCHIS  3,044,059
SYSTEM FOR ELIMINATING CALIBRATION ERRORS
Filed June 23, 1960
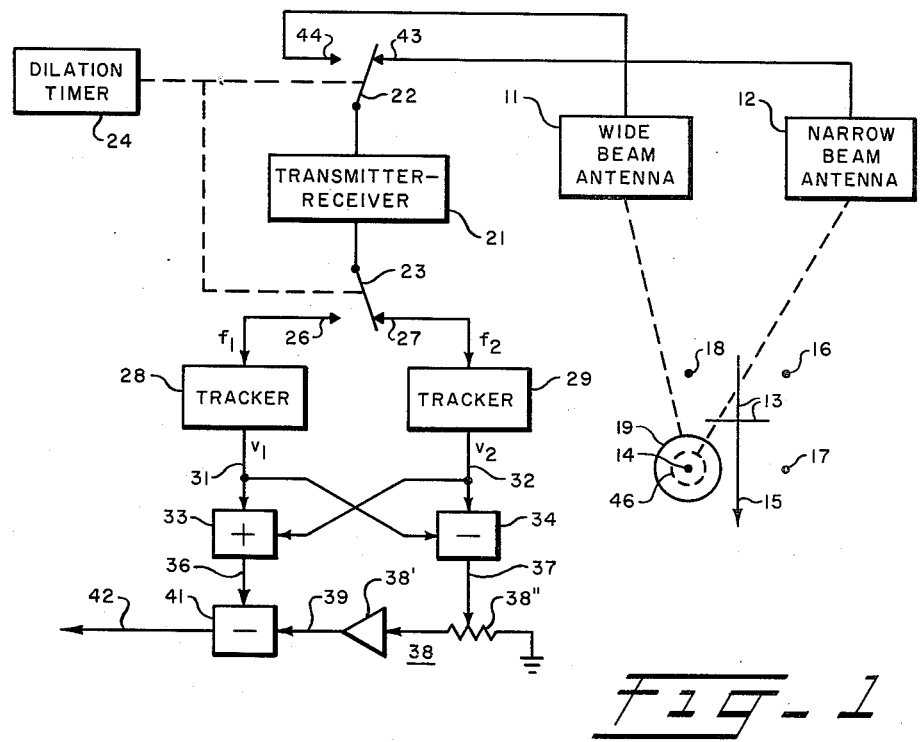
Fig. 1
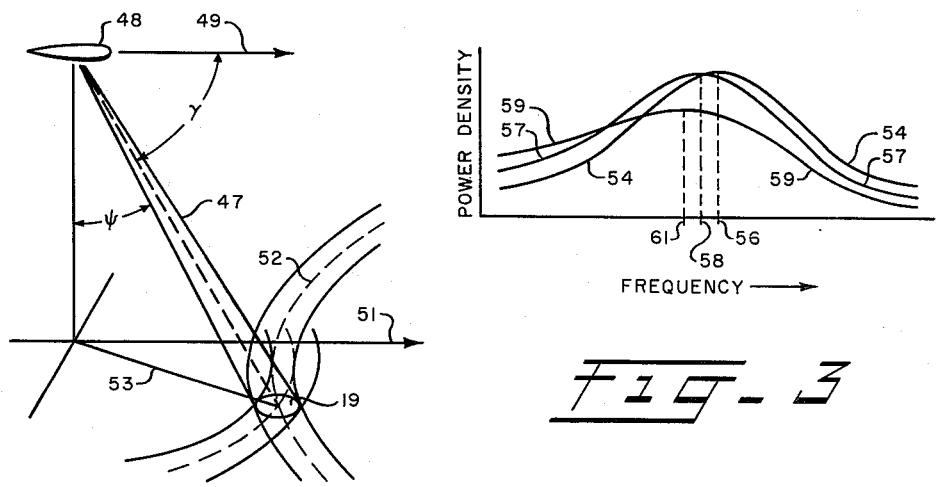
Fig. 2
Fig. 3
INVENTOR.
SAMUEL BELCHIS
BY
ATTORNEY.

United States Patent Office 3,044,059
Patented July 10, 1962

3,044,059
SYSTEM FOR ELIMINATING
CALIBRATION ERRORS
Samuel Belchis, Hartsdale, N.Y., assignor to General
Precision, Inc., a corporation of Delaware
Filed June 23, 1960, Ser. No. 38,195
7 Claims. (Cl. 343—8)

This invention relates to microwave radar navigation systems, and particularly to an arrangement for eliminating system errors caused by water reflection and by the altitude hole effect.

When microwave radiation is reflected from a water surface the amount of energy returned to the receiver-transmitter depends not only on the distance but also on the angle of incidence at the water surface, being much reduced at large angles. This is termed the sea reflection effect. When pulsed microwave echoes are received by a receiver-transmitter which is gated off during the transmission of each pulse, those parts of the echoes are lost which arrive at the receiver when it is gated off. This is termed the altitude hole effect.

Both the altitude hole effect and the sea reflection effect cause signal reduction and, what is more important, cause errors in the Doppler information in the echoes by selective attenuation of frequencies composing the Doppler spectrum.

Both types of error are observed as apparent changes in the receiver-transmitter calibration. For example, if the receiver-transmitter is part of an aircraft navigation system measuring aircraft ground speed, the ratio of the Doppler difference frequency and the ground speed is the calibration constant of the system. Apparent changes in this constant due to sea reflection and altitude hole effects cause errors in the system output. Such errors can amount to as much as 5 percent and, if not neutralized, greatly impair the usefulness of the system.

Both kinds of error are dependent on the fact that the radar beams employed have appreciable thickness in the vertical plane including the incident angle of the beam at the ground. Even when this beam width is no more than 3 or 4 degrees, about the minimum possible, these errors may be too large to be tolerated.

The present invention provides a means of, effectively, reducing the beam width to zero. It does this using two separate circular cross-section beams of different widths. From their return signals there is computed the Doppler difference frequency which would be returned by a beam of zero frequency. The signal representing this computed frequency is employed to secure the system outputs.

In one embodiment of this invention, the microwave antenna assembly of a radar navigation system is duplicated by an identical assembly except that it emits wider beams. The transmitted energy and return signals are periodically switched between these two antenna assemblies by a timer, giving an effect as if the antenna beam were periodically dilated and contracted. After passage of the return signals through the microwave receiver and demodulator the demodulated signals are applied through another switch under control of the dilation timer to two frequency trackers. There the respective wide and narrow beam Doppler spectra are tracked and their central frequencies are derived, continuous signals representative thereof being emitted. These continuous signals are applied to a computer which computes an output frequency $f_0$, the Doppler frequency which would be emitted by a hypothetical beam of zero thickness. This output representing the frequency $f_0$ is completely unaffected by either sea or altitude hole errors.

One purpose of this invention is to provide a Doppler radar system the accuracy of which is unaffected by altitude hole and sea reflection effects.

Another purpose of this invention is to provide a Doppler radar system having periodically dilating and contracting microwave radiation beams, providing echo signals from which are computed such signal returns as would be secured from beams of zero thickness. These computed signals are free of altitude hole and sea reflection errors.

A further understanding of this invention will be secured from the detailed description and drawings, in which:

FIGURE 1 is a block diagram of an embodiment of the invention.

FIGURE 2 is an isomeric projection showing the geometry of a beam of radiation projected from an aircraft to the earth.

FIGURE 3 illustrates frequency spectra of Doppler signals.

Referring now to FIGURE 1, two complete and separate microwave antennas, 11 and 12, are provided. These antennas are identical except that the beams emitted by antenna 11 have an angular width of about 10° and those emitted by antenna 12 have an angular width of only about 4°. Each antenna emits two beams simultaneously which are switched periodically, by a timer not shown, so that during one beaming period the two beams are emitted obliquely downward, one forward and to the right and the other aft and to the left, and during the other period one is emitted forward and left, and the other aft and right. The antenna beams are aimed so that the patterns of illumination of the ground by the antennas are similar and superimposed. Thus, for example, in the ground plan 13 of the beam illuminations, the arrow 15 indicates the ground track forward direction and the four points 14, 16, 17 and 18 depict the centers of the four beam spots illuminated by the wide beam antenna 11 and also by the narrow beam antenna 12. During a particular beaming half period, for example, two wide beams are centered at points 14 and 16 and two narrow beams are centered at the same points.

A typical antenna such as antenna 11 or 12, the cooperating switching mechanism and a transmitter-receiver 21 for use therewith, are described in more detail in Patent No. 2,915,748.

During each beaming half period the two antennas are alternated in operation by a switch 22 and a dilation timer 24, so that at any instant one of the antennas, 11 or 12, illuminates the two ground areas, but the two never illuminate the ground simultaneously. Areas and periods of illumination as used herein are to be understood as including reflection from the area and reception by the antenna as well as transmission from the antenna toward the areas. The dilation timer 24 is also connected for operation of a switch 23 which switches the output of the transmitter-receiver in concert with the input switching of switch 22. The frequency of this dilation timer must not conflict with any other frequencies employed in the system. In particular, the frequency must be distinctly different from the beam-switching frequency. For example, if the beam-switching frequency is 5 cycles per second, the dilation frequency can be 23 c.p.s.

The receiver outputs at switch contacts 26 and 27, having frequency spectra equal to the Doppler difference frequency spectra, are applied to two frequency trackers 28 and 29. These frequency trackers are similar. Each finds and tracks the average frequency of the Doppler spectrum applied to it and produces an output voltage which is proportional to this center frequency. The voltage, $v_1$, of the tracker 28 output in conductor 31 is proportional to the center frequency, $f_1$, of the Doppler spectrum secured from the wide beam antenna 11, and the voltage, $v_2$, of the tracker 29 output in conductor 32 is proportional to the center frequency $f_2$ of the Doppler spectrum secured from the narrow beam antenna 12.

A fuller description of frequency trackers is published in Transactions of the Institute of Radio Engineers, volume ANE-4, December 1957, page 202, in an article entitled, "The AN/APN-81 Doppler Navigation System."

The conductors 31 and 32 are connected to a summing circuit 33 which sums the voltages $v_1$ and $v_2$. The conductors 31 and 32 are also connected to a differencing circuit 34 which subtracts the same two voltages. These summing and differencing circuits may consist of paralleled impedances followed by an amplifier, as described on page 33 of volume 21 of the Radiation Laboratory series entitled "Electronic Instruments," by Greenwood et al. A voltage representing the sum of voltages $v_1$ and $v_2$ is emitted on conductor 36 and another voltage representing the difference is emitted on conductor 37.

The voltage of the difference output in conductor 37 is multiplied in a multiplying circuit 38 by a constant which depends on beam thickness. This multiplying circuit may conveniently consist of a calibrated amplifier 38′ combined with a gain-control potentiometer 38″. The output voltage of multiplying circuit 38 in conductor 39 is subtracted from the voltage in conductor 36 in a differencing circuit 41, and the output is secured at conductor 42. This is the system output, and is a voltage representing the Doppler difference frequency which would be secured from one of the four beams of the four-beam pattern if that beam were of zero thickness or width.

If two outputs are required from a radar navigation system it would be necessary to duplicate all components shown in the figure following the two antennas 11 and 12. This duplicating equipment would provide a second output similar to that secured on conductor 42 but for a different beam.

In the operation of this system as shown in FIGURE 1, let it be supposed that during alternate forty-sixths of seconds the switch 22 dwells on contact 44 and switch 23 dwells on contact 26, so that a Doppler spectrum signal is derived from the reflections of the beam pattern of wide beam antenna 11 from the large forward-right spot 19. This spectrum signal is applied to tracker 28. The center of this spectrum has the center frequency $f_1$. Similarly, during the remainder of the time the switch 22 dwells on contact 43 and switch 23 dwells on contact 27, so that a Doppler spectrum signal of center frequency $f_2$ derived from reflections of the narrow beam antenna 12 pattern at the small forward spot 46 is applied to tracker 29. During a selected instant under consideration the wide beam antenna 11 is in operation but the narrow beam antenna is unenergized. Consequently the illuminated spot 19 is indicated by a solid line circle to indicate this fact, while the spot 46 is indicated by a dotted circle.

The trackers 28 and 29 contain integration elements, so that their outputs $v_1$ and $v_2$ continuously represent the frequencies $f_1$ and $f_2$.

FIGURE 2 shows a microwave beam 47 emitted by an aircraft 48 flying in the direction 49 parallel to the ground track 51. The cross section of beam 47 perpendicular to its axis has a circular form. The beam 47 illuminates a forward spot 19 at the right side of the ground track. Its axis is at an angle $\gamma$ with respect to the direction 49. The spot 19 is a part of the hyperbolic zone 52 formed on the earth, which is a zone bounded by isodops, or lines of constant Doppler shift.

The decrease of radiation power in such a pencil beam cross section from its center outward is approximately Gaussian. When the beam is reflected from land the reflected or echo power is similarly distributed. However, when the beam is reflected from water the reflected power rapidly increases across the beam as the angle of incidence, $\psi$, decreases, and somewhat the same law is followed due to altitude holes, at aircraft elevations at which this hole effect is found. When these two factors, that due to normal cross-section variation and that due to sea or altitude hole effects, are combined, to a first approximation the power P at any point in the echo beam having coordinates $x$ and $y$ is $$P = A e^{-(sx + m(x^2 + y^2))} \qquad (1)$$

In this equation A is a scale constant, $s$ is a constant proportional to the rate of sea or altitude hole attenuation variation with the incident angle $\psi$, $x$ is the coordinate in the direction along the radius 53, $y$ is the coordinate in the direction perpendicular to the $x$ direction, and $m$ is a constant inversely representing the thickness of the pencil beam 47. In order to convert this equation to an equation in terms of the constant Doppler hyperbolas 52, coordinate transformation equations are applied. Integration across the illuminated spot yields an expression in which the term $$\frac{s \cos a}{2m}$$

represents the amount by which the center of the power of the beam is shifted perpendicularly to the constant-Doppler hyperbolic lines (isodops) because of a sea or altitude hole effect. The constant $a$ is the angle through which the coordinates have been rotated.

The expression relating the Doppler difference frequency, $D_f$ to the beam "looking" angle, $\gamma$, is $$D_f = \frac{2V}{\lambda} \cos \gamma, \qquad (2)$$

in which V is the aircraft velocity and $\lambda$ is the microwave frequency. Since the angle $\lambda$ varies across the target spot 19, the received Doppler difference frequency varies accordingly. The Doppler frequency signal secured at the receiver output does not therefore have a single frequency, but contains a spectrum of frequencies. When free of sea and altitude hole effects the power density versus frequency spectrum has an approximately symmetrical and Gaussian shape as indicated in FIGURE 3 at 54. The central frequency 56 of this form is emitted by a tracker having this spectrum applied to its input. However, when a sea or hole effect is present, the spectrum is distorted somewhat toward the low frequency end as shown by the curve 57, and the central frequency as measured by a tracker is shifted to 58. When the beam is wider the shift is greater, as shown by the spectral form 59, with its tracked center frequency at 61. Although the skewed Gaussian forms of FIGURE 3 are physically correct, to a first approximation the sea or altitude hole reflected forms centered at 58 and 61 can be treated as if they are Gaussian, and the equations so treat them.

When the Equation 2 is differentiated and combined with the expression $$\frac{s \cos a}{2m}$$

and the result is algebraically manipulated, there is secured the equation $$f_0 = \frac{f_1 + f_2}{2} - \frac{f_1 - f_2}{2}\left(\frac{1 + m_1/m_2}{1 - m_1/m_2}\right) \qquad (3)$$

In this equation $f_0$ is the Doppler frequency which would be received from an imaginary or hypothetical beam of zero width emitted at the same $\gamma$ angle as are the actual two beams, and $m_1$ and $m_2$ are the constants representing the widths of the two beams actually used.

This Equation 3 is instrumented in FIGURE 1 as follows. An amplitude representing the sum $f_1 + f_2$ is found at the output conductor 36 of the summing circuit 33. An amplitude representing the difference $f_1 - f_2$ is found at the output conductor 37 of the differencing circuit 34. This difference is multiplied in the multiplying circuit 38 by an amount representing the value of the known constant term $$\frac{1+m_1/m_2}{1-m_1/m_2}$$

The product is subtracted from the sum term to form an output at conductor 42 having a potential representative of $2f_0$.

This output is completely free of error due to sea or altitude hole effects. It may be combined with a similar output from similar components, as stated, representing the dilating beam at position 16, similarly free from error, for application to a computer to compute aircraft speed and other outputs. The output at conductor 42 may alternatively be used for other purposes.

What is claimed is:

1. A system for eliminating calibration errors in a Doppler radio comprising, antenna means emitting and receiving a broad beam reflected from a selected target area, antenna means emitting and receiving a narrow beam reflected from the center portion of said selected target area, means deriving two signals representing the respective Doppler spectrum center frequencies of the reflected broad and narrow beams, and computing means having said two signals impressed thereon and producing therefrom a single computed signal representing the Doppler spectrum center frequency which would be found in the spectrum returned from a hypothetical antenna beam of zero thickness reflected from a point in said selected target area.

2. A system for eliminating calibration errors in a Doppler radio comprising, a wide beam antenna emitting and receiving at least one beam reflected from a selected target area, a narrow beam antenna emitting and receiving at least one beam reflected from the center portion of said selected target area, means deriving two signals representing the respective Doppler spectrum center frequencies from the reflected signals received by said wide and narrow beam antennas and computing means having said two signals impressed thereon and producing therefrom a single computed signal representing the Doppler spectrum center frequency which would be found in the spectrum returned from a hypothetical antenna beam of zero thickness reflected from said selected target area.

3. A system for eliminating calibration errors in accordance with claim 2 in which said computing means includes summing and differencing means emitting sum and difference signals representing the sum and difference of said two signals, multiplying means multiplying said difference signal by a constant, and a subtracting circuit receiving the product output of said multiplying means and said sum signal and producing said computed signal.

4. A system for eliminating calibration errors in accordance with claim 3 in which said constant is one plus the ratio of two constants representing the widths of beams emitted by said two antennas, divided by one minus the ratio of said two constants.

5. A system for eliminating calibration errors in a Doppler radio comprising, a wide beam antenna having at least one beam, said one beam striking a selected target area, a narrow beam antenna having at least one beam, said one beam striking the center portion of the same selected target area, a transmitter, means alternately connecting said antennas to said transmitter, receiving means deriving from said wide and narrow beam antennas two continuous signals representing the center frequencies of the Doppler spectra reflected by said selected target area, and computing means connected to said last-named means computing from said two continuous signals a single signal representing the Doppler spectrum center frequency which would be returned from said selected target area by a hypothetical beam of zero thickness.

6. A system for eliminating calibration errors in a Doppler radio comprising, a wide pencil beam antenna having at least one beam, said one beam striking a selected target area and being reflected therefrom, a narrow pencil beam antenna having at least one beam, said one beam striking the center portion of the same selected target area and being reflected therefrom, a transmitter, switch means alternately connecting said antennas to said transmitter, means deriving from the echo signals of said wide and narrow beam antennas respective Doppler frequency difference spectra, tracking means deriving from said spectra two continuous signals representing the center frequencies thereof, and computing means connected to said tracking means computing from the two continuous signals a single signal representing the frequency of a signal which would be returned from said selected target area by a hypothetical beam of zero thickness which is therefore not subject to calibration errors.

7. A system for eliminating calibration errors in a Doppler radio comprising, a wide circular cross section beam antenna having at least one beam, said one beam striking a selected reflective target and being reflected back to said wide beam antenna, a narrow circular cross section beam antenna having at least one beam, the axis of said one beam being coincident with the axis of the one beam of said wide beam antenna, a transmitter, switch means alternately connecting said wide and narrow beam antennas to said transmitter, receiver means deriving from the signals reflected back to said wide and narrow beam antennas respective Doppler frequency difference spectra, a pair of frequency trackers, said switch means connecting each of said frequency trackers in alternation to said receiving means in synchronism with the switching of said antennas to said transmitter, a computer including an adding circuit, first and second subtracting circuits and a multiplying circuit, means applying signals from said frequency trackers to said adding and first subtracting circuits to form sum and difference signals, means applying said difference signal to said multiplying circuit whereby a product signal is formed representing the multiplication of said difference signal by a constant, means applying said product signal to said second subtracting circuit, means applying said sum signal to said second subtracting circuit and means securing from said second subtracting circuit an output signal representing the frequency of a signal which would be returned from said selected reflective target by a beam of zero thickness and which is therefore not subject to calibration errors caused by sea reflection effects and altitude hole effects.

No references cited.